(12) United States Patent
Virgil et al.

(10) Patent No.: US 8,275,800 B1
(45) Date of Patent: Sep. 25, 2012

(54) SPLITTING POLYGONS WITH INTERIOR RINGS

(75) Inventors: Kevin D. Virgil, San Diego, CA (US);
Michael Leon Reed, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 233 days.

(21) Appl. No.: 12/850,941

(22) Filed: Aug. 5, 2010

(51) Int. Cl.
*G06F 7/00* (2006.01)

(52) U.S. Cl. ........ 707/798; 707/803; 707/812; 345/420; 345/423; 345/505; 702/1; 702/57

(58) Field of Classification Search ............... 707/999.1, 707/999.003, 798, 803, 812; 345/420, 423, 345/505; 702/1, 57
See application file for complete search history.

(56) References Cited

U.S. PATENT DOCUMENTS

| | | | | |
|---|---|---|---|---|
| 5,986,674 A * | 11/1999 | Yamato | ........................ | 345/441 |
| 6,895,344 B2 * | 5/2005 | Ramaswamy | .................. | 702/57 |
| 6,917,877 B2 * | 7/2005 | Yang | .............................. | 345/630 |
| 7,979,479 B2 * | 7/2011 | Staebler et al. | ............... | 707/812 |
| 2004/0215641 A1 * | 10/2004 | Kothuri et al. | ................ | 707/100 |
| 2005/0203932 A1 * | 9/2005 | Kothuri et al. | ................ | 707/100 |
| 2009/0091568 A1 | 4/2009 | Ravada et al. | | |
| 2009/0147013 A1 * | 6/2009 | Stenson et al. | ................ | 345/505 |

* cited by examiner

*Primary Examiner* — Hosain Alam
*Assistant Examiner* — Jieying Tang
(74) *Attorney, Agent, or Firm* — Howard Speight

(57) ABSTRACT

A spatial feature is considered for storage in a database system running on a computer. The spatial feature includes a polygon, P. The polygon includes an outer ring, OR, and the area within the outer ring. The polygon includes an interior ring contained within the polygon. The computer removes the interior ring from the polygon. The computer determines a line along which to split the polygon without regard for the location of the inner ring within the polygon. The computer splits the polygon into two polygons, SP1 and SP2, along the line. The computer applies the interior ring to the two split polygons by invoking a point set difference between the interior ring and the two split polygons. The computer stores the split polygons in the database system on the computer.

20 Claims, 7 Drawing Sheets

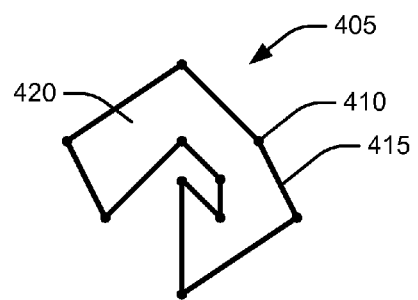
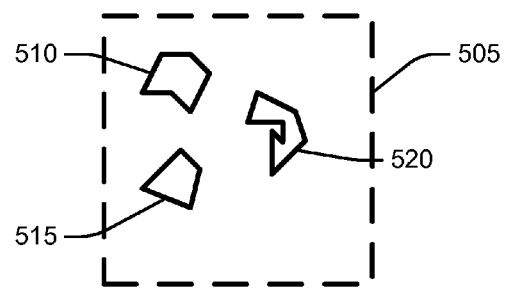
FIG. 4  FIG. 5
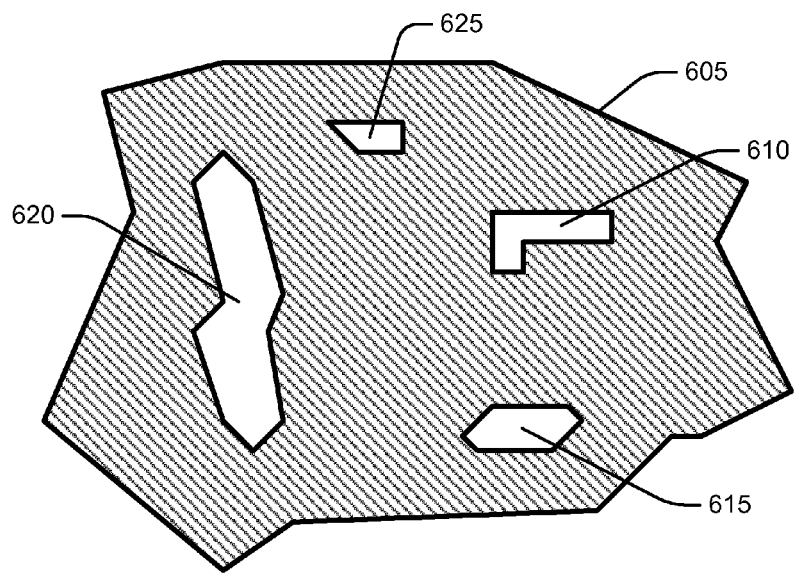
FIG. 6

SPLITTING POLYGONS WITH INTERIOR RINGS

BACKGROUND

Database systems, including Relational Database Management Systems ("RDBMS") are sometimes required to accommodate geospatial data types that can store such spatial features as points, linestrings, polygons, multipoints, multilinestrings, multipolygons, and geometry collections. Such spatial features can be used to represent a wide variety of useful information, such as geographical elements on maps, network elements on a chart of a company's communications network, or elements on a company's organizational chart. Some of these spatial features, such as a polygon, which is planar area bounded by a closed path or circuit composed of a finite sequence of straight line segments meeting at vertices, and a multipolygon, which is a set of two or more polygons, can contain a large number of vertices and they can contain one or more interior rings, which are open areas bounded by a closed path or circuit.

Representing a spatial feature containing one or more interior rings within a database is a challenge.

SUMMARY

In general, in one aspect, the invention features a method. The method includes considering a spatial feature for storage in a database system running on a computer. The spatial feature includes a polygon, P. The polygon includes an outer ring, OR, and the area within the outer ring. The outer ring includes a plurality of vertices, ORV1 . . . ORVM, with the first and last vertex being the same (i.e., ORV1=ORVM, etc.), lines connecting consecutive vertices (i.e., ORV1 and ORV2, ORV2 and ORV3). The polygon includes an interior ring contained within the polygon. The computer removes the interior ring from the polygon. The computer determines a line along which to split the polygon without regard for the location of the inner ring within the polygon. The computer splits the polygon into two polygons, SP1 and SP2, along the line. The computer applies the interior ring to the two split polygons by invoking a point set difference between the interior ring and the two split polygons. The computer stores the split polygons in the database system on the computer.

Implementations of the invention may include one or more of the following. Element a) may include storing the interior ring in a vector on the computer. Element b) may include performing a triangulation technique selected from the group of triangulation techniques consisting of selecting the location of the line so that the number of outer ring vertices in each of the polygons is substantially equal and selecting the location of the line so that the area in each of the polygons is substantially equal. Invoking the point set difference in element d) may include performing one of the following actions: d1) determining that the interior ring does not intersect with SP2, and d1) applying the entire interior ring to SP1. Invoking the point set difference in element d) may include performing one of the following actions d1) determining that the interior ring intersects with both SP1 and SP2, and d2) subtracting the portion of the interior ring that intersects with SP1 from SP1 and the portion of the interior ring that intersects with SP2 from SP2. After a first iteration of elements a) through d), and prior to performing element e) the method may determine that one of SP1 and SP2 are too large and repeat elements a) through d) on SP1 and SP2, to produce SP11, SP12, SP21, and SP22, wherein element e) comprises determining that split polygons SP11, SP12, SP21, and SP22 are not too large; and storing the split polygons SP11, SP12, SP21, and SP22 in the database system on the computer. The spatial feature may include a plurality of polygons. A subset of the plurality of polygons may include interior rings. The method may include performing elements a) through e) for each polygon that contains an interior ring.

In general, in another aspect, the invention features a computer program stored in a tangible medium. The program includes executable instructions that cause a computer to consider a spatial feature for storage in a database system running on a computer. The spatial feature includes a polygon, P. The polygon includes an outer ring, OR, and the area within the outer ring. The outer ring including a plurality of vertices, ORV1 . . . ORVM, with the first and last vertex being the same (i.e., ORV1=ORVM, etc.) and lines connecting consecutive vertices (i.e., ORV1 and ORV2, ORV2 and ORV3). The spatial feature further includes an interior ring contained within the polygon. The program includes executable instructions that cause the computer to a) remove the interior ring from the polygon. The program includes executable instructions that cause the computer to b) determine a line along which to split the polygon without regard for the location of the inner ring within the polygon. The program includes executable instructions that cause the computer to c) split the polygon into two polygons, SP1 and SP2, along the line. The program includes executable instructions that cause the computer to d) apply the interior ring to the two split polygons by invoking a point set difference between the interior ring and the two split polygons. The program includes executable instructions that cause the computer to e) store the split polygons in the database system on the computer.

In general, in another aspect, the invention features a database system. The database system includes one or more nodes. The database system includes a plurality of CPUs, each of the one or more nodes providing access to one or more CPUs. The database system includes a plurality of virtual processes, each of the one or more CPUs providing access to one or more virtual processes. Each virtual process is configured to manage data, including rows from the set of database table rows, stored in one of a plurality of data-storage facilities. The database system includes a process that considers a spatial feature for storage in the database system. The spatial feature includes a polygon, P. The polygon includes an outer ring, OR, and the area within the outer ring. The outer ring includes a plurality of vertices, ORV1 . . . ORVM, with the first and last vertex being the same (i.e., ORV1=ORVM, etc.) and lines connecting consecutive vertices (i.e., ORV1 and ORV2, ORV2 and ORV3). The polygon includes an interior ring contained within the polygon. The process includes a) removing the interior ring from the polygon. The process includes b) determining a line along which to split the polygon without regard for the location of the inner ring within the polygon. The process includes c) splitting the polygon into two polygons, SP1 and SP2, along the line. The process includes d) applying the interior ring to the two split polygons by invoking a point set difference between the interior ring and the two split polygons. The process includes e) storing the split polygons in the database system on the computer.

BRIEF DESCRIPTION OF THE DRAWINGS

FIG. 4 illustrates a polygon.
FIG. 5 illustrates a multipolygon.

FIG. 6 illustrates a polygon with interior rings.

DETAILED DESCRIPTION

Figure 1:
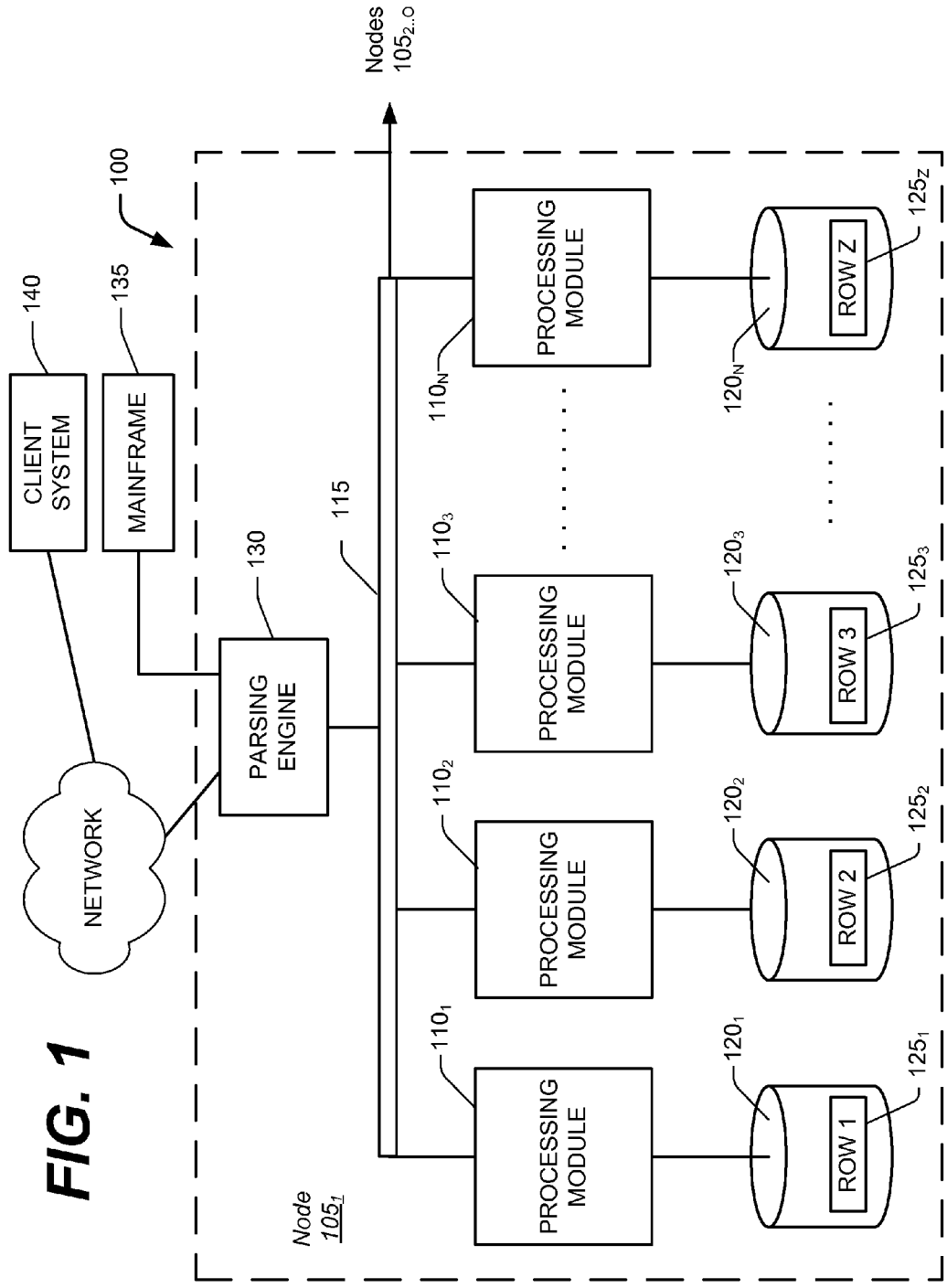
FIG. 1 is a block diagram of a node of a parallel processing database system.

The technique disclosed herein has particular application, but is not limited, to large databases that might contain many millions or billions of records managed by a database system ("DBS") 100, such as a Teradata Active Data Warehousing System available from the assignee hereof. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

In addition to the physical division of storage among the storage facilities illustrated in FIG. 1, each storage facility is also logically organized. One implementation divides the storage facilities into logical blocks of storage space. Other implementations can divide the available storage space into different units of storage. The logical units of storage can ignore or match the physical divisions of the storage facilities.

Figure 2:
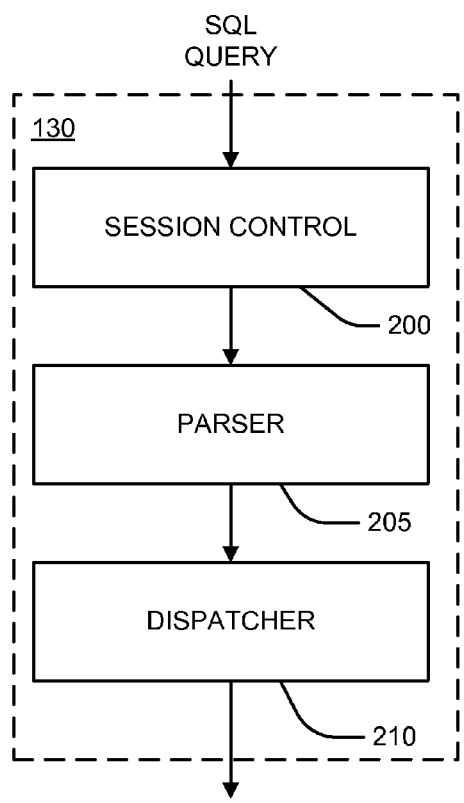
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
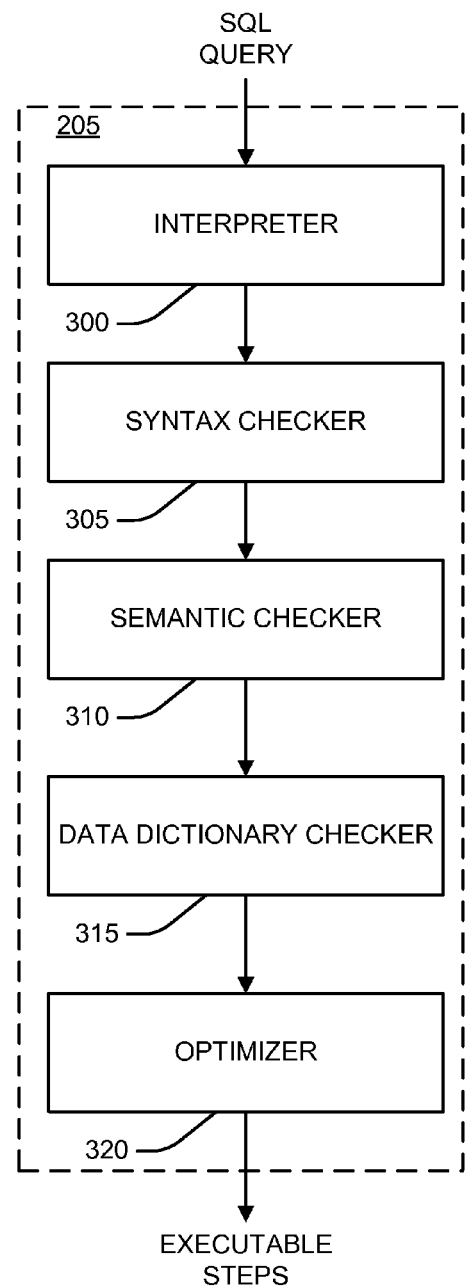
FIG. 3 is a block diagram of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request and produces executable steps to execute the plan. A dispatcher 210 issues commands to the processing modules $110_{1 \ldots N}$ to implement the executable steps.

An example polygon 405, shown in FIG. 4, includes three or more vertices 410 (only one vertex is labeled) with lines 415 (only one is labeled) between the nodes 410. The lines form a closed path or circuit that bounds an area 420. In one embodiment, the area is part of the polygon. Thus, a polygon, P, consists of N vertices, V1 . . . VN, with lines between consecutive vertices (i.e., between V1 and V2, between V2 and V3, . . . and between VN−1 and VN), with the first and last vertices being the same (i.e., V1=VN) to form a closed path or circuit, and the area bounded by the closed path or circuit. Note that, for simplicity, the vertices are not illustrated in other drawings in this application.

An example multipolygon 505 (note that the dashed line represents a grouping and possibly, although not necessarily, a bounding area), shown in FIG. 5, includes multiple polygons 510, 515, and 520. Thus, a multipolygon consists of M polygons. Each polygon includes P vertices (P not necessarily being the same for each polygon), lines between consecutive vertices, with the first and last vertices being the same, and the area bounded by the polygon's closed path or circuit.

A polygon with inner rings, illustrated in FIG. 6, includes a polygon 605 containing one or more inner rings 610, 615, 620, 625. Each inner ring includes nodes and lines between the vertices defining a path or circuit and the area within the path or circuit. In one embodiment, the inner rings define area with the polygon that are within the path or circuit that defines the polygon but that are excluded from the area associated with the polygon. For example, imagine that polygon 605 is a geographical representation of the water in a lake. The interior rings might be islands or other bodies in the lake where graphical representation of the lake should not show water.

While the example shown in FIG. 6 is a relatively simple polygon with interior rings and would not be difficult or complicated to store in a database, a person of ordinary skill could readily imagine a polygon with interior rings that would be much more complicated and would require extensive storage within a database and would be computationally expensive when being manipulated or displayed. In addition, large polygons might require a Large Object to store the vertices. Storing and manipulating polygons or multipolygons with interior rings can be challenging.

In one embodiment, a polygon with interior rings is divided for storage. A polygon without interior rings can be iteratively divided using a technique such as triangulation, in which the polygon is divided into a set of triangles. One known technique for triangulating is to add lines from one vertex in the polygon to all other vertexes. In one embodiment, the location of the line is determined without consideration of the location of the interior ring or rings within the polygon. That is, in one embodiment, no attempt is made to have the line intersect the interior ring or rings.

One embodiment of an iterative technique for dividing a polygon with interior rings is described below:
1. Start with a polygon that contains rings. Separate multipolygons into individual polygons.
2. Remove the interior rings from the polygon and store them in a vector.
3. Use a technique such as triangulation to determine where to split the polygon. In one embodiment, the split decision is based on balancing the number of vertices in each polygon. In one embodiment, the split decision is based on balancing the area of each polygon.
4. Split the polygon into two polygons (now referred to as the split polygons).
5. Apply each interior ring stored in the vector to the two split polygons. The interior rings are applied by invoking a point set difference between each ring and the polygon. That is, the point set difference will return the set of elements in the polygon that are not in each interior ring. If the ring doesn't intersect with the split polygon, it has no effect on the polygon. If the ring is entirely inside of the polygon, that split polygon will receive the ring. If the ring partially intersects with the split polygon, that portion of intersection will be subtracted from the split polygon. Also, the ring may divide the polygon in which case, the split polygon will become two split polygons. If the ring encloses the split polygon completely, the split polygon disappears.
6. Continue the iterative approach with polygons that have had the interior rings applied to them until the polygon is of the desired size (i.e., go back to 1).

Figure 7:
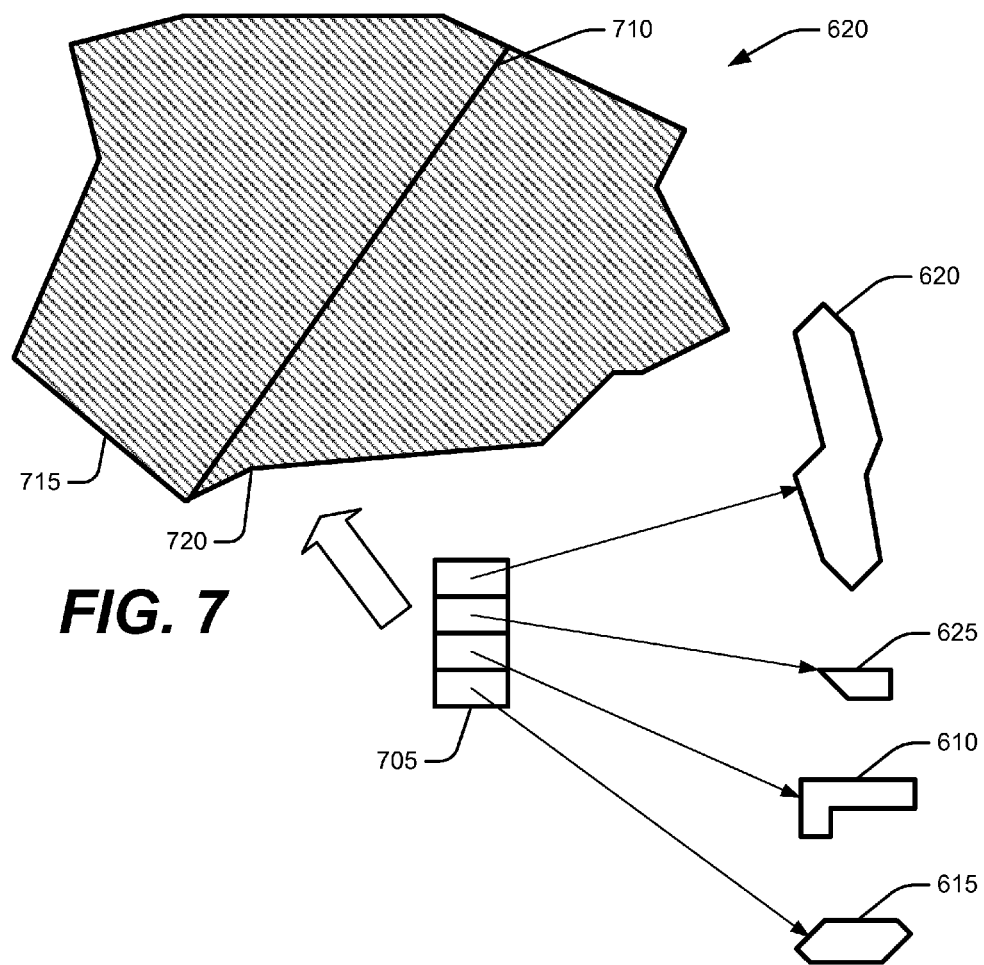
FIG. 7 illustrates the polygon of FIG. 6 with the interior rings removed and split into two polygons.

FIGS. 7-10 illustrate the application of one embodiment this technique to the polygon illustrated in FIG. 6. First, as shown in FIG. 7, in one embodiment the interior rings are removed from the polygon and stored in a vector 705. In one embodiment, the vector is an array that stores the locations of the vertices for each interior ring.

In one embodiment, a line 710 is defined through the polygon to divide the polygon into two polygons. In one embodiment, the line 710 is located so as to divide the polygon into two polygons of equal area or substantially equal area (i.e., areas within 10 percent of each other). In one embodiment, the line 710 is located so as to divide the polygon into two polygons having the same, or substantially the same, number of vertices. In one embodiment, the polygon 620 is then divided along the line 710 to form two split polygons 715, 720.

Figure 8:
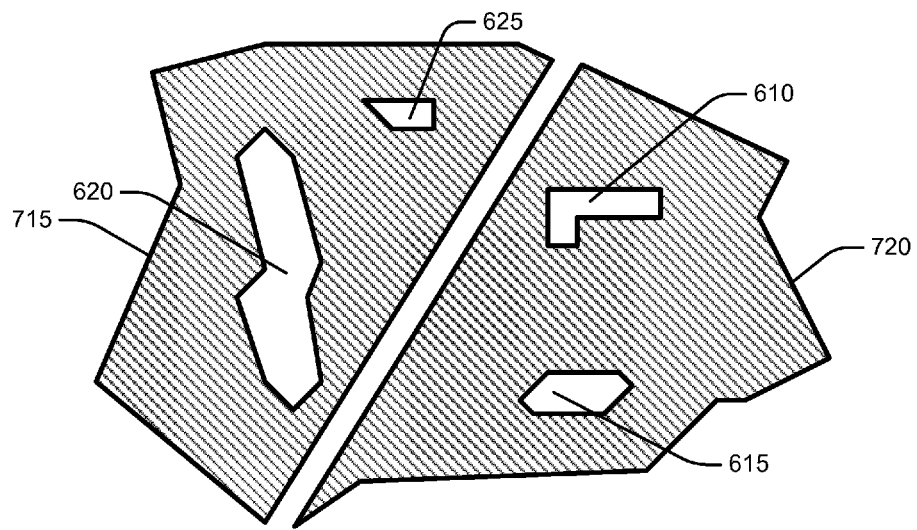
FIG. 8 illustrates the split polygons of FIG. 7 with the interior rings applied.

In one embodiment, the interior rings 610, 615, 620, and 625 are then applied to the two split polygons 715, 720, as indicated by the broad arrow in FIG. 7, with the result shown in FIG. 8. In one embodiment, the interior rings 610 and 615 are entirely inside split polygon 720 and do not intersect split polygon 715. Consequently, in one embodiment, split polygon 720 retains interior rings 610 and 615. In one embodiment, the interior rings 620 and 625 are entirely inside split polygon 715 and do not intersect split polygon 720. Consequently, in one embodiment, split polygon 715 retains interior rings 620 and 625.

In one embodiment, the polygons are then checked to see if they are an appropriate size to be stored in the database. In this case, for the sake of further explanation, assume that neither split polygon 715, 720 is an appropriate size. In that case, in one embodiment, the process continues by further splitting the split polygons. In one embodiment, it is possible that one of the split polygons is an appropriate size and that the process of further splitting need only be applied to the split polygon that is not of an appropriate size. In one embodiment, the split polygon that is the appropriate size is split and the process iterates until all of the split polygons are of an appropriate size for storage in the database.

Figure 9:
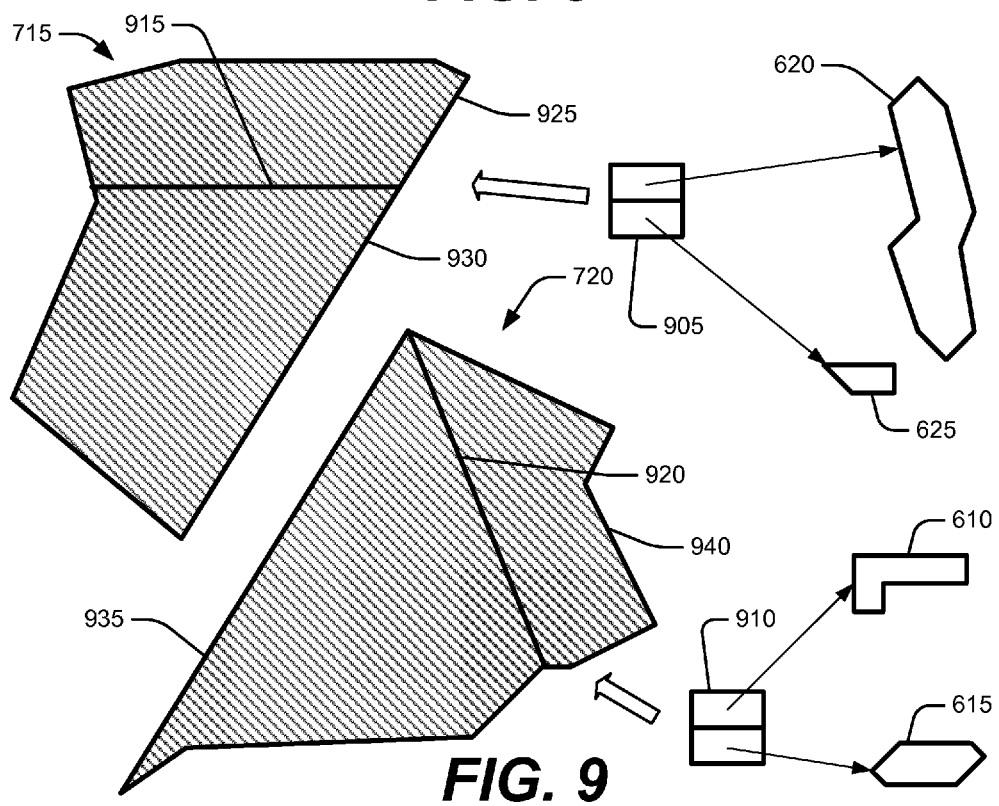
FIG. 9 illustrates the interior rings removed from the split polygons of FIG. 7 and each of the split polygons of FIG. 7 split into two polygons.

Continuing the example, as shown in FIG. 9, in one embodiment, interior rings 620 and 625 are removed from split polygon 715 and stored in vector 905. Similarly, in one embodiment, interior rings 610 and 615 are removed from split polygon 720 and stored in vector 910. In one embodiment, vector 905 and vector 910 are the same vector or array. In one embodiment in which a vector or array contains vector 905 and vector 910, the vector includes values to tie each vector entry to the split polygon with which each interior ring is associated. For example, in one embodiment, the array contains pairs of values, one value in the pair indicating the interior ring and the other value in the pair indicating the polygon associated with the interior ring referenced in the pair.

In one embodiment, a line 915 is defined through split polygon 715, using a technique such as one of the triangulation techniques described above. Similarly, in one embodiment, a line 920 is defined through split polygon 720, using a technique such as one of the triangulation techniques described above. In one embodiment, the split polygons 715 and 720 are then split along lines 915 and 920, respectively, to form 4 new split polygons 925, 930, 935, and 940.

Figure 10:
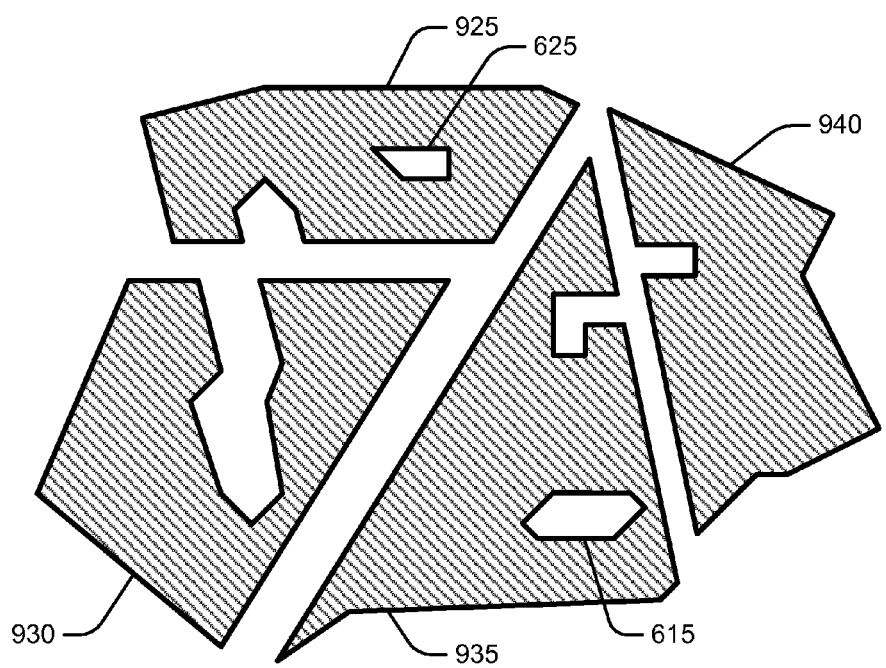
FIG. 10 illustrates the split polygons of FIG. 9 with the interior rings applied.

In one embodiment, the interior rings 620, 625 are then applied to split polygons 925 and 930 and the interior rings 610 and 615 are applied to split polygons 935 and 940, as indicated by the broad arrows in FIG. 9, to produce the result shown in FIG. 10. Interior ring 610 intersected split polygon 935 and split polygon 940 and, thus, in one embodiment, the portion of interior ring 610 that intersected split polygon 935 is subtracted from split polygon 935 and the portion of interior ring 610 that intersected split polygon 940 is subtracted from split polygon 940. Interior ring 620 intersected split polygon 925 and split polygon 930 and, thus, in one embodiment, the portion of interior ring 620 that intersected split polygon 925 is subtracted from split polygon 925 and the portion of interior ring 620 that intersected split polygon 930 is subtracted from split polygon 930. Interior ring 625 is entirely within split polygon 925, does not intersect any other split polygon, and, in one embodiment, is retained by split polygon 925. Interior ring 615 is entirely within split polygon 935, does not intersect any other split polygon, and, in one embodiment, is retained by split polygon 935.

In one embodiment, the technique next determines whether split polygons 925, 930, 935, and 940 are of an appropriate size to store in the database. Assume in this case that they are determined to be of an appropriate size. In that case, in one embodiment, the split polygons are stored.

In one embodiment, this technique can be used in at least two different contexts.

1. The technique can become part of a spatial data loading utility that splits the polygons before they are loaded into the database.
2. The technique can be used with a Table Function User-Defined Function (UDF) or system-defined table function. The input to the table function would be a selection of the following: a geometry identifier (e.g., name or number) that uniquely identifies the geometry, the geometry, and the maximum geometry size in bytes or vertices. The maximum size could be specified such that LOBs would not be needed to store the geometry data. The geometries would be recursively split until they fall within the maximum size that is specified. The table function would return the split geometries as a table with a slice number to identify each individual piece of the geometry.

In one embodiment, the table function specification would be

```
CREATE FUNCTION SplitGeometries
(
    geom_id             INTEGER,
    geom                ST_Geometry,
    max_geom_size       INTEGER
)
RETURNS TABLE ( geom_id INTEGER, SliceNumber
INTEGER, geom ST_Geometry
)
```

In one embodiment, the rows that are returned are placed in a table and partitioned or hashed on the SliceNumber so that each of the slices for each geometry would be distributed across a parallel database. In one embodiment, the geom_id that is returned is the geom._id that is passed into the table function for that geometry. In one embodiment, each slice in the geometry would have the same geom_id so that each slice can be associated with its original geometry.

Figure 11:
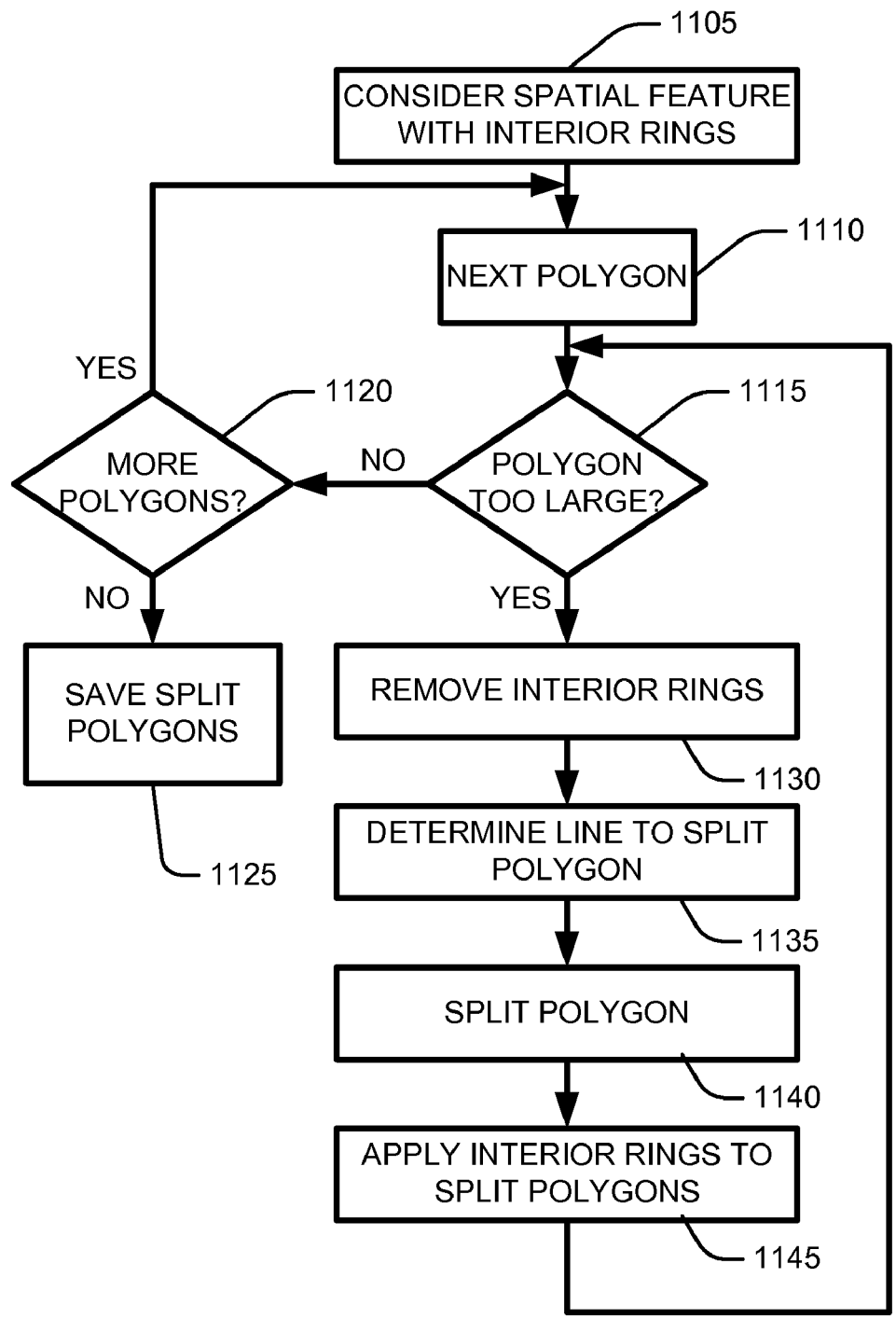
FIG. 11 is a flow chart of a technique for splitting polygons with interior rings.

In use, in one embodiment shown in FIG. 11, the technique begins with a spatial feature, such as a polygon containing an interior ring or a multipolygon in which at least one of the polygons contains an interior ring (block 1105).

In one embodiment, the technique then considers the next polygon (block 1110). If the spatial feature is a polygon, in one embodiment, this block selects the polygon. If the spatial feature is a multipolygon, in one embodiment, this block selects the next polygon. In the first iteration, in one embodiment, the next polygon is the first polygon.

In one embodiment, the technique next determines if the selected polygon is too large to store in the database (block 1115). If it is not, in one embodiment the technique checks to see if there are more polygons to consider (block 1120). If there are not, in one embodiment the split polygon (or the original polygon if it was not too large) is stored (block 1125). If there are more polygons to consider, in one embodiment the technique returns to block 1110 and selects the next polygon.

If the polygon is too large (block 1115), in one embodiment the interior rings are removed (block 1130) and stored in a vector or array. In one embodiment, a line is then determined to split the polygon (block 1135) using one of the techniques described above. In one embodiment, the polygon is then split along the line (block 1140). In one embodiment, the interior rings are then applied to the split polygons (block 1145). In one embodiment, the technique then returns to block 1115 to determine if the resulting split polygons are too large.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method, comprising:
considering a spatial feature for storage in a database system running on a computer, the spatial feature comprising:
   a polygon, P, comprising:
      an outer ring, OR, and the area within the outer ring;
      the outer ring comprising:
         a plurality of vertices, designated $ORV1, \ldots ORVM$, with the vertex designated ORV1 being the first vertex, the vertex designated ORVM being the last vertex, vertices having consecutive numbers after "ORV" in their respective designations being consecutive vertices, and the first and last vertex being the same so that $ORV1=ORVM$;
         lines connecting consecutive vertices; and
     an interior ring contained within the polygon;
a) the computer removing the interior ring from the polygon;
b) the computer determining a line along which to split the polygon without regard for the location of the inner ring within the polygon;
c) the computer splitting the polygon into two polygons, SP1 and SP2, along the line;
d) the computer applying the interior ring to the two split polygons by invoking a point set difference between the interior ring and the two split polygons; and
e) the computer storing the split polygons in the database system on the computer.

2. The method of claim 1 wherein element a) comprises storing the interior ring in a vector on the computer.

3. The method of claim 1 wherein element b) comprises:
performing a triangulation technique selected from the group of triangulation techniques consisting of:
   selecting the location of the line so that the number of outer ring vertices in each of the polygons is substantially equal; and
   selecting the location of the line so that the area in each of the polygons is substantially equal.

4. The method of claim 1 wherein invoking the point set difference in element d) comprises performing one of the following actions:
   d1) determining that the interior ring does not intersect with SP2; and
   d1) applying the entire interior ring to SP1.

5. The method of claim 1 wherein invoking the point set difference in element d) comprises performing one of the following actions:
   d1) determining that the interior ring intersects with both SP1 and SP2; and
   d2) subtracting the portion of the interior ring that intersects with SP1 from SP1 and the portion of the interior ring that intersects with SP2 from SP2.

6. The method of claim 1 further comprising:
after a first iteration of elements a) through d), and prior to performing element e) determining that one of SP1 and SP2 are too large;
repeating elements a) through d) on SP1 and SP2, to produce SP11, SP12, SP21, and SP22; and wherein element e) comprises determining that split polygons SP11, SP12, SP21, and SP22 are not too large; and storing the split polygons SP11, SP12, SP21, and SP22 in the database system on the computer.

7. The method of claim 1 wherein:
the spatial feature comprises a plurality of polygons;
a subset of the plurality of polygons include interior rings; and
the method further comprises performing elements a) through e) for each polygon that contains an interior ring.

8. A computer program, stored in a non-transitory storage medium, the program comprising executable instructions that cause a computer to:
consider a spatial feature for storage in a database system running on a computer, the spatial feature comprising:
a polygon, P, comprising:
an outer ring, OR, and the area within the outer ring; the outer ring comprising:
a plurality of vertices, designated ORV1, . . . ORVM, with the vertex designated ORV1 being the first vertex, the vertex designated ORVM being the last vertex, vertices having consecutive numbers after "ORV" in their respective designations being consecutive vertices, and the first and last vertex being the same so that ORV1=ORVM;
lines connecting consecutive vertices; and
an interior ring contained within the polygon;
a) remove the interior ring from the polygon;
b) determine a line along which to split the polygon without regard for the location of the inner ring within the polygon;
c) split the polygon into two polygons, SP1 and SP2, along the line;
d) apply the interior ring to the two split polygons by invoking a point set difference between the interior ring and the two split polygons; and
e) store the split polygons in the database system on the computer.

9. The computer program of claim 8 wherein, when performing element a), the computer stores the interior ring in a vector on the computer.

10. The computer program of claim 8 wherein, when performing element b), the computer:
performs a triangulation technique selected from the group of triangulation techniques consisting of:
selecting the location of the line so that the number of outer ring vertices in each of the polygons is substantially equal; and
selecting the location of the line so that the area in each of the polygons is substantially equal.

11. The computer program of claim 8 wherein, when invoking the point set difference in element d), the computer performs one of the following actions:
d1) determine that the interior ring does not intersect with SP2; and
d1) apply the entire interior ring to SP1.

12. The computer program of claim 8 wherein, when invoking the point set difference in element d), the computer performs one of the following actions:
d1) determine that the interior ring intersects with both SP1 and SP2; and
d2) subtract the portion of the interior ring that intersects with SP1 from SP1 and the portion of the interior ring that intersects with SP2 from SP2.

13. The computer program of claim 8 further comprising executable instructions that cause the computer to:
after a first iteration of elements a) through d), and prior to performing element e) determine that one of SP1 and SP2 are too large;
repeat elements a) through d) on SP1 and SP2, to produce SP11, SP12, SP21, and SP22; and wherein
when performing element e), the computer determines that split polygons SP11, SP12, SP21, and SP22 are not too large; and stores the split polygons SP11, SP12, SP21, and SP22 in the database system on the computer.

14. The computer program of claim 8 wherein:
the spatial feature comprises a plurality of polygons;
a subset of the plurality of polygons include interior rings; and
the computer program further comprises executable instructions that cause the computer to perform elements a) through e) for each polygon that contains an interior ring.

15. A database system comprising:
one or more nodes;
a plurality of CPUs, each of the one or more nodes providing access to one or more CPUs;
a plurality of virtual processes, each of the one or more CPUs providing access to one or more virtual processes;
each virtual process configured to manage data, including rows from the set of database table rows, stored in one of a plurality of data-storage facilities;
a process that:
considers a spatial feature for storage in the database system, the spatial feature comprising:
a polygon, P, comprising:
an outer ring, OR, and the area within the outer ring; the outer ring comprising:
a plurality of vertices, designated ORV1, . . . ORVM, with the vertex designated ORV1 being the first vertex, the vertex designated ORVM being the last vertex, vertices having consecutive numbers after "ORV" in their respective designations being consecutive vertices, and the first and last vertex being the same so that ORV1=ORVM;
lines connecting consecutive vertices; and
an interior ring contained within the polygon;
a) removes the interior ring from the polygon;
b) determines a line along which to split the polygon without regard for the location of the inner ring within the polygon;
c) splits the polygon into two polygons, SP1 and SP2, along the line;
d) applies the interior ring to the two split polygons by invoking a point set difference between the interior ring and the two split polygons; and
e) stores the split polygons in the database system on the computer.

16. The system of claim 15 wherein element a) comprises storing the interior ring in a vector on the computer.

17. The system of claim 15 wherein element b) comprises:
performing a triangulation technique selected from the group of triangulation techniques consisting of:
selecting the location of the line so that the number of outer ring vertices in each of the polygons is substantially equal; and
selecting the location of the line so that the area in each of the polygons is substantially equal.

18. The system of claim 15 wherein invoking the point set difference in element d) comprises performing one of the following actions:
- d1) determining that the interior ring does not intersect with SP2; and
- d1) applying the entire interior ring to SP1.

19. The system of claim 15 wherein invoking the point set difference in element d) comprises performing one of the following actions:
- d1) determining that the interior ring intersects with both SP1 and SP2; and
- d2) subtracting the portion of the interior ring that intersects with SP1 from SP1 and the portion of the interior ring that intersects with SP2 from SP2.

20. The system of claim 15 further comprising:
- after a first iteration of elements a) through d), and prior to performing element e) determining that one of SP1 and SP2 are too large;
- repeating elements a) through d) on SP1 and SP2, to produce SP11, SP12, SP21, and SP22; and wherein
- element e) comprises determining that split polygons SP11, SP12, SP21, and SP22 are not too large; and storing the split polygons SP11, SP12, SP21, and SP22 in the database system on the computer.

\* \* \* \* \*